US012809200B2

(12) United States Patent
Ding et al.

(10) Patent No.: US 12,809,200 B2
(45) Date of Patent: Nov. 24, 2026

(54) DISPLAY FRAME AND DISPLAY

(71) Applicants: Chengdu BOE Optoelectronics Technology Co., Ltd., Chengdu (CN); BOE Technology Group Co., Ltd., Beijing (CN)

(72) Inventors: Xuefeng Ding, Beijing (CN); Liang Li, Beijing (CN); Tianma Li, Beijing (CN); Qijun Zhang, Beijing (CN); Dake Wang, Beijing (CN); Tao Xi, Beijing (CN); Xiaoli Liu, Beijing (CN); Haohao Li, Beijing (CN)

(73) Assignees: Chengdu BOE Optoelectronics Technology Co., Ltd., Chengdu (CN); Beijing BOE Technology Development Co., Ltd., Beijing (CN)

( * ) Notice: Subject to any disclaimer, the term of this patent is extended or adjusted under 35 U.S.C. 154(b) by 120 days.

(21) Appl. No.: 18/694,156

(22) PCT Filed: Nov. 29, 2021

(86) PCT No.: PCT/CN2021/134172

§ 371 (c)(1),
(2) Date: Mar. 21, 2024

(87) PCT Pub. No.: WO2023/092609

PCT Pub. Date: Jun. 1, 2023

(65) Prior Publication Data

US 2025/0138354 A1 May 1, 2025

(51) Int. Cl.
*G02F 1/1333* (2006.01)
*G02F 1/13357* (2006.01)

(52) U.S. Cl.
CPC .. *G02F 1/133317* (2021.01); *G02F 1/133305* (2013.01); *G02F 1/133314* (2021.01); *G02F 1/13332* (2021.01); *G02F 1/133608* (2013.01)

(58) Field of Classification Search
CPC ................................................ G02F 2201/465
See application file for complete search history.

(56) References Cited

U.S. PATENT DOCUMENTS 6,292,239 B1 * 9/2001 Nagamura ........ G02F 1/133308 349/61
6,919,940 B2 * 7/2005 Noh ................. G02F 1/133615 349/58

(Continued)

FOREIGN PATENT DOCUMENTS

CN 101482660 A 7/2009
CN 202720414 U 2/2013

(Continued)

OTHER PUBLICATIONS

Machine Translation of CN208000440U (Year: 2025).*

(Continued)

*Primary Examiner* — Allen L Parker
*Assistant Examiner* — Peter Krim
(74) *Attorney, Agent, or Firm* — IPro, PLLC

(57) ABSTRACT

A display frame includes a front frame, a back panel, a middle frame in the front frame, and an elastic pad between the top surface of a side wall of the middle frame facing the front edge and the front edge. The front frame includes a frame structure and a front edge located at one end of the frame structure and extending towards the center of the frame structure. Opposite side walls of the frame structure have a first snap part. The back plate includes a bottom plate and a side plate located on the side edge of the bottom plate and extending towards one side of the bottom plate. The inner surface of the bottom plate is opposite to the inner surface of the front edge. The side plate has a second snap part for fitting with the first snap part.

10 Claims, 5 Drawing Sheets

(56) References Cited

U.S. PATENT DOCUMENTS

| | | | | |
|---|---|---|---|---|
| 9,323,083 | B2 * | 4/2016 | Lee | G02F 1/133308 |
| 2006/0209227 | A1 * | 9/2006 | Miyamoto | G02F 1/133308<br>349/58 |
| 2020/0064676 | A1 | 2/2020 | Liang | |

FOREIGN PATENT DOCUMENTS

| | | | |
|---|---|---|---|
| CN | 204362192 | U | 5/2015 |
| CN | 106304740 | A | 1/2017 |
| CN | 208000440 | U | * 10/2018 |
| JP | 2009229964 | A | * 10/2009 |
| KR | 20060018498 | A | 3/2006 |
| WO | 2016045147 | A1 | 3/2016 |

OTHER PUBLICATIONS

Machine Translation of JP2009229964A (Year: 2025).*
PCT/CN2021/134172 international search report Aug. 17, 2022.
CN202180003671.1 first office action dated Nov. 19, 2025.

* cited by examiner

DISPLAY FRAME AND DISPLAY

CROSS REFERENCE TO RELATED APPLICATION

The present disclosure is a National Stage of International Application No. PCT/CN2021/134172, filed Nov. 29, 2021, the entire contents of which are incorporated herein by reference.

TECHNICAL FIELD

The disclosure relates to the field of display technology, in particular to a display frame and a display.

BACKGROUND

In a liquid crystal display, an outer frame generally includes a front frame and a back panel. A middle frame is provided in the interior. The front frame and the back panel are fixedly assembled. Generally, the front frame and the back panel are connected together through a buckle structure on the side. However, due to manufacturing errors, there will be a certain deviation in the size between the front frame and the back panel. Due to the size deviation, there will be a snap-fit gap between the front frame and the back panel in some assemblies, which will cause the snap-fit between the front frame and the back panel to become loose. Especially in the automotive displays, if there is a too large snap-fit gap between the front frame and the back panel, it will cause abnormal sounds due to collision of the snap-fit between the front frame and the back panel, which will make the backlight module in the outer frame shake, and cause internal components to collide and produce abnormal sounds, resulting in poor performance.

SUMMARY

Embodiments of the present disclosure provide a display frame including: a front frame, a back panel, a middle frame, and an elastic pad.

The front frame includes a frame structure and a front edge. The front edge is located at one end of the frame structure and extends toward a center of the frame structure. Opposite side walls of the frame structure are provided with a first snap part.

The back panel includes a bottom plate and a side plate which is on a side edge of the bottom plate and extends toward one side of the bottom plate. An inner surface of the bottom plate is opposite to an inner surface of the front edge. The side plate is opposite to a side wall of the frame structure. The side plate is provided with a second snap part for fitting with the first snap part. When the first snap part is snap-fitted with the second snap part, the second snap part is located on a side, facing the front edge, of the first snap part.

The middle frame is located in the front frame. The elastic pad is located between: a top surface of a side wall of the middle frame facing the front edge, and the front edge. The elastic pad is used for supporting between the top surface of the side wall of the middle frame and the front edge, so that the first snap part and the second snap part are tightly engaged.

In the above-mentioned display frame, an elastic pad is provided between the middle frame and the front edge to increase the support thickness between the front edge and the bottom plate, eliminate the fit gap between the back panel and the front frame, and play a role of fool-proofing, so that the back panel and the front frame are tightly engaged, to effectively avoid the abnormal sounds caused by the collision of between the back panel and the front frame, and avoid the abnormal sounds and poor performance caused by the shaking of the internal components of the display frame.

Optionally, the top surface of the side wall of the middle frame is provided with a groove. The elastic pad is located in the groove. The thickness of the elastic pad is greater than the depth of the groove.

Optionally, the thickness of the elastic pad and the depth of the groove satisfy a following relationship:

$$f+D<d\leqslant\frac{f}{n};$$

herein, f is the depth of the groove, D is a fit gap between the first snap part and the second snap part, d is the thickness of the elastic pad, and n is a compression ratio of the elastic pad.

Optionally, the top surface of the side wall of the middle frame is provided with a boss. The elastic pad is located on a peripheral side of the boss. The thickness of the elastic pad is greater than the height of the boss.

Optionally, the thickness of the elastic pad and the height of the boss satisfy a following relationship:

$$e+D<d\leqslant\frac{e}{n};$$

herein, e is the height of the boss, D is a fit gap between the first snap part and the second snap part, d is the thickness of the elastic pad, and n is a compression ratio of the elastic pad.

Optionally, the elastic pad is arranged on the top surface of the side wall, opposite to the first snap part, of the middle frame.

Optionally, along an extension direction of the side wall of the middle frame on which the elastic pad is located, at least two elastic pads are provided, and the at least two elastic pads are sequentially arranged at intervals.

Optionally, the opposite side walls of the middle frame are provided with bulges protruding toward an inner side of the middle frame. The elastic pad is arranged on the top surface of the side wall, provided with the bulges, of the middle frame.

Optionally, along an extension direction of the side wall of the middle frame on which the bulges are located, at least two bulges are provided, and the at least two bulges are sequentially arranged at intervals.

Optionally, the elastic pad includes a silicone pad.

Optionally, the side plate is located inside the side wall of the frame structure. The side wall of the frame structure is provided with a notch. A side, away from the front edge, of the notch bends and extends inward to form the first snap part. The first snap part has a first lap surface on a side facing the front edge. An outer side of the side plate is provided with a protrusion protruding outward, and the protrusion constitutes the second snap part. The second snap part has a second lap surface on one side facing the bottom plate. The second lap surface is used for snap-fitting with the first lap surface. The middle frame is located between the top surface of the side plate facing the front edge, and the front edge.

Embodiments of the present disclosure also provide a display, including any display frame provided by the above technical solutions, a display panel installed on the middle frame, and a backlight module installed in back panel. The backlight module is located between the display panel and the bottom plate of and the back panel.

In the figures: 1—front frame; 2—back panel; 3—middle frame; 4—elastic pad; 11—first side wall; 12—front edge; 21—bottom plate; 22—side plate; 31—second side wall; 32—extension part; 111—first snap part; 221—second snap part; 311—groove; 312—boss.

DETAILED DESCRIPTION

The technical solutions in the embodiments of the present disclosure will be clearly and completely described below with reference to the accompanying drawings in the embodiments of the present disclosure. Apparently, the described embodiments are only some of the embodiments of the present disclosure, rather than all of the embodiments. Based on the embodiments in the present disclosure, all other embodiments obtained by those of ordinary skill in the art without creative efforts fall within the scope of protection the present disclosure.

Figure 1:
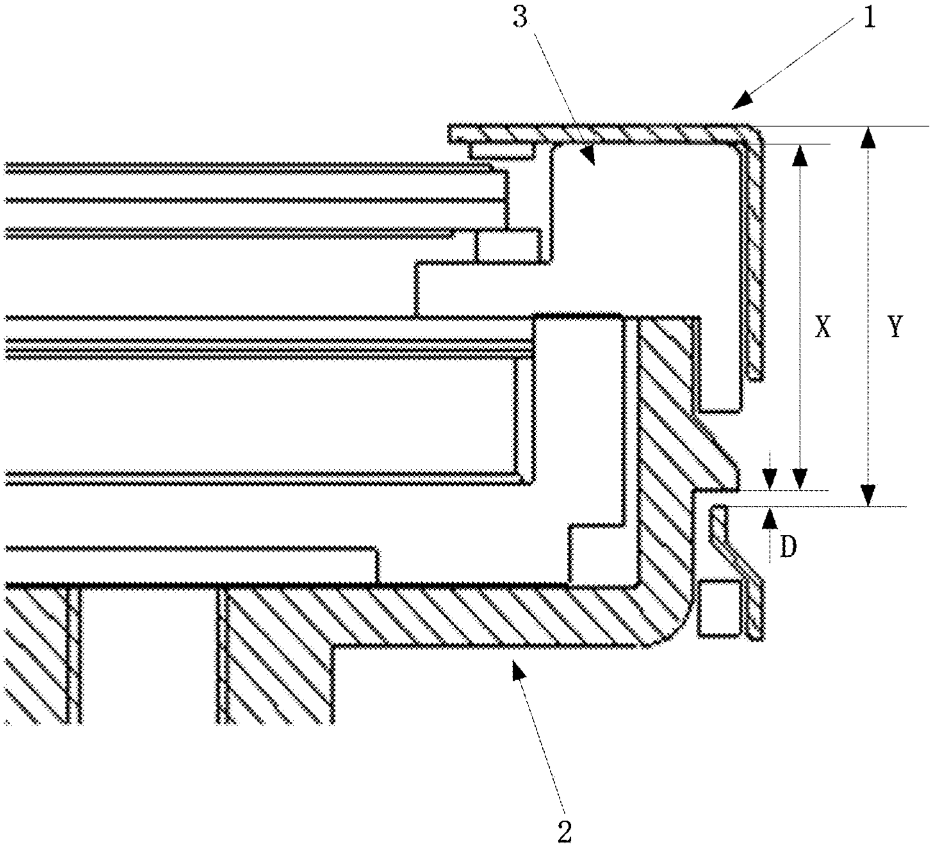
FIG. 1 is a schematic view of a partial cross-section of a display without an elastic pad according to an embodiment of the present disclosure.
Figure 2:
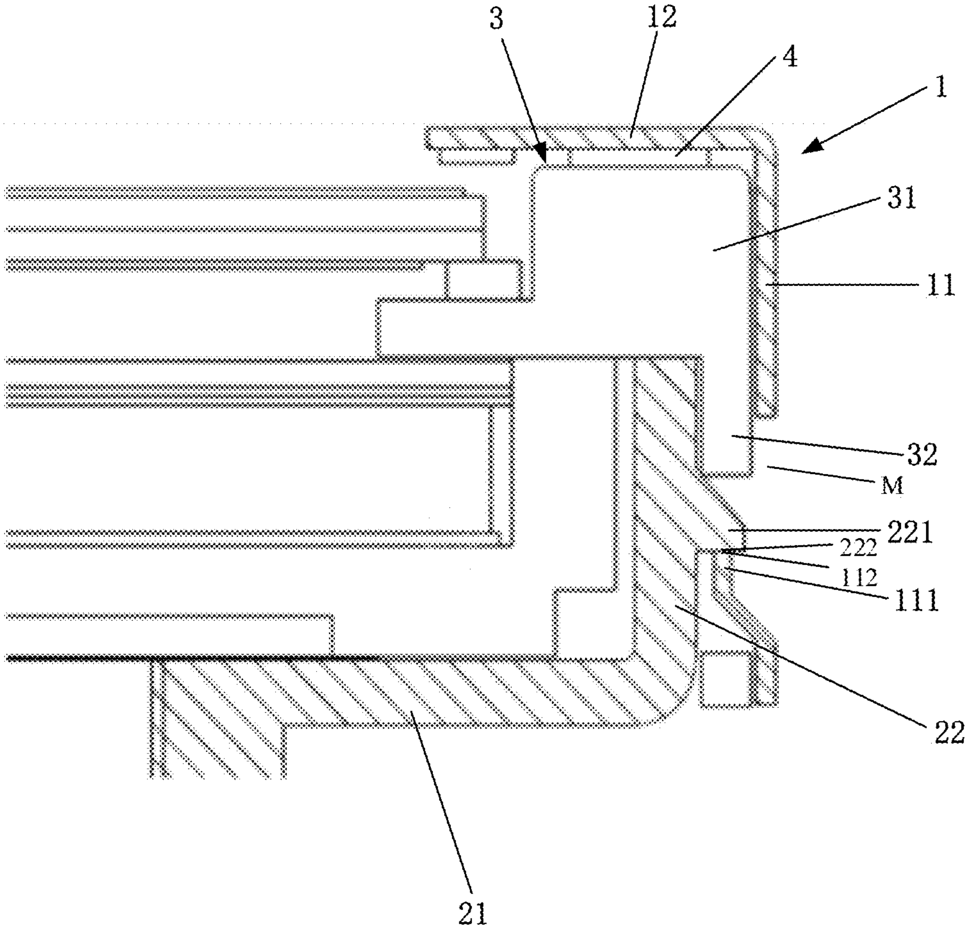
FIG. 2 is a schematic view of a partial cross-section of a display according to an embodiment of the present disclosure.

As shown in FIGS. 1-2, embodiments of the present disclosure provide a display frame. The display frame includes a front frame 1, a back panel 2, a middle frame 3 and an elastic pad 4. The front frame 1 includes a frame structure and a front edge 12. The frame structure is a frame structure enclosed by side walls. Specifically, a shape of the frame structure can be a rectangle, that is, the frame structure is a rectangular frame. For the convenience of illustration, in the embodiments, the side wall of the frame structure is called a first side wall 11. The front edge 12 is located at one end of the frame structure and extends toward a center of the frame structure. The front edge 12 is connected with one end of the first side wall 11 and extends toward the center of the frame structure. One end of each first side wall 11 can be connected with a front edge 12, and the front edge 12 is arranged perpendicular to the first side wall 11. Moreover, opposite first side walls 11 of the frame structure can be provided with a first snap part 111. Specifically, the first snap part 111 may be provided only on the sides of a pair of opposite first side walls 11 of the frame structure, or the first snap part 111 may be provided on each first side wall 11 of the frame structure. A second snap part 221 is provided on the back panel to engage with the first snap part 111 to achieve the snap-fit connection. Specifically, the back panel 2 includes a bottom plate 21 and a side plate 22. The side plate 22 is arranged along a side edge of the bottom plate 21 and extends toward one side of the bottom plate 21. The side plate 22 is perpendicular to the bottom plate 21. The bottom plate 21 is opposite to the front edge 12 of the front frame. The side plate 22 is opposite to the first side wall 11. The second snap part 221 is arranged on one side of the side plate 22 to fit with the first snap part 111. When the first snap part 111 is engaged with the second snap part 221, the second snap part 221 is located on a side, facing the front edge 12, of the first snap part 111. The middle frame is arranged in the front frame. In a direction perpendicular to the bottom plate 21, the side wall of the middle frame 3 can be supported between the back panel and the front edge 12. Herein, for the convenience of illustration, the side wall of the middle frame 3 is called a second side wall 31. The second side wall 31 can be supported between the back panel and the front edge 12, so that the first snap part 111 and the second snap part 221 are snap-fitted. In order to avoid a fit gap between the first snap part 111 and the second snap part 221, an elastic pad 4 is provided on a side, facing the front edge 12, of the side wall of the middle frame. The elastic pad 4 is between the second side wall 31 and the front edge 12, and plays the role of supporting and fool-proofing. When there is a fit gap between the first snap part 111 and the second snap part 221 due to manufacturing deviation, a support thickness of the elastic pad 4 can offset the fit gap between the first snap part 111 and the second snap part 221, so that the first snap part 111 and the second snap part 221 are tightly engaged. Even if there is small manufacturing deviation or no manufacturing deviation, and a fit gap between the first snap part 111 and the second snap part 221 is not caused, since the elastic pad 4 is elastic, when the first snap part 111 engages with the second snap part 221, the elastic pad is compressed and its thickness decreases, which will not affect the fitting between the first snap part 111 and the second snap part 221, so as to allow the first snap part 111 and the second snap part 221 to have the interference fit through a slight deformation of the structure, resulting in the tighter snap-fit.

Therefore, in the above-mentioned display frame, an elastic pad is provided between the middle frame and the front edge 12 to increase the support thickness between the front edge 12 and the bottom plate 21, eliminate the fit gap between the back panel and the front frame, and play a role of fool-proofing, so that the back panel and the front frame are tightly engaged, to effectively avoid the abnormal sounds caused by the collision of between the back panel and the front frame, and avoid the abnormal sounds and poor performance caused by the shaking of the internal components of the display frame.

In a possible implementation manner, the above-mentioned middle frame is a rubber frame. The elastic pad may be a flexible rubber pad, specifically a silicone pad, or other elastic rubber pads, which are not limited in the embodiments.

In a possible implementation, the side plate 22 is located inside the side wall of the frame structure. Exemplarily, as shown in FIG. 2, the side plate 22 is opposite to the first side wall 11. The first side wall 11 is on the outer side of the side plate 22. A notch M is provided on the first side wall 11. The side, away from the front edge 12, of the notch is connected with a bent arm that bends and extends inward. The bent arm forms the first snap part 111. The first snap part 111 has a first lap surface 112 on the side facing the front edge 12. The side plate 22 is inside the first side wall 11. There is a distance between a top surface of the side plate 22 facing the front edge 12 and the front edge 12. The middle frame can be placed on the top surface of the side plate 22, and between the front edge 12 and the top surface of the side plate 22. A side, facing the bottom plate 21, of the second side wall 31 of the middle frame has an extension part 22 that extends between the first side wall 11 and the side plate 22, so that the first side wall 11 and the side plate 22 are tightly fitted in the direction parallel to the bottom plate 21 to avoid shaking. The outer side of the side plate 22 has a protrusion protruding outward to form the second snap part 221. The second snap part 221 has a second lap surface 222 on the side facing the bottom plate 21. The second lap surface can be snap-fitted with the first lap surface. Specifically, a portion, corresponding to the first snap part 111 and the second snap part 221, of the extension part 32 has a through slot, which allows the first snap part 111 and the second snap part 221 to pass through the through slot on both sides of the through slot respectively and to achieve snap-fit. Exemplary, the first lap surface and the second lap surface can be arranged parallel to the front edge 12, which is convenient for the assembly of the back panel and the front frame, and snap-fit is firm. The elastic pad is between the second side wall 31 and the front edge 12, and the support thickness of the elastic pad is in the same direction as the fit gap between the first lap surface and second lap surface, which can be directly compared with the fit gap, to facilitate the installation and arrangement of the elastic pad.

As shown in FIG. 1, for the convenience of illustration, the direction perpendicular to the bottom plate 21 of the back panel is taken as the Z direction. In the Z direction, the distance between the second lap surface of the second snap part 221 and an inner surface of the front edge 12 is X, and the distance between the first lap surface of the first snap part 111 and an outer surface of the front edge 12 is Y. Considering the manufacturing capacity for the back panel and the front frame, it is recommended that the manufacturing precision is: the precision of the distance between the second lap surface of the second snap part 221 and the inner surface of the front edge 12 is X±0.1 mm, and the precision of the distance between the first lap surface of the first snap part 111 and an outer surface of the front edge 12 is Y±0.1 mm. The thickness of the front edge 12 is defined as T, then the snap-fit gap between the back panel and the front frame (that is, the fit gap between the first snap part 111 and the second snap part 221) D=Y−X−T. Due to the size deviation during manufacturing, the snap-fit gap between the back panel and the front frame will have the two following extreme situations.

Situation 1: when the precision of Y takes the lower limit size, and the precision of X takes the upper limit size:

the extreme snap-fit gap between the back panel and the front frame is D'=(Y−0.1)−(X+0.1)−T, which needs to satisfy D'≥0, that is, D=Y−X−T≥0.2 mm. In the actual situation, not every snap-fit structure between the back panel and the front frame is at its extreme size. When the snap-fit structure between the back panel and the front frame is at the extreme size in situation 1, the interference fit between the back panel and front frame can be achieved through slight structural deformation, thereby achieving a tight snap-fit effect. Therefore, preferably, D=0.1 mm can be selected as the standard for the size of the snap-fit structure of the back panel and the front frame, which can ensure the normal fit of the back panel and the front frame, and make the front frame and the back panel tightly fit without any gap.

Situation 2: when the precision of Y takes the upper limit size, and the precision of X takes the lower limit size:

the extreme snap-fit gap between the back panel and the front frame is D"=(Y+0.1)−(X−0.1)−T=Y−X−T+0.2. According to the above situation 1, the standard of D=0.1 mm is preferred for size design, and then D"=0.3 mm, so there will be a fit gap between the back panel and the front frame, and there is a risk of abnormal sounds caused by the collision between the front frame and the back panel. Moreover, the extreme snap-fit gap D"=0.3 mm is produced under the condition of actual manufacturing capacity and is unavoidable.

Figure 3:
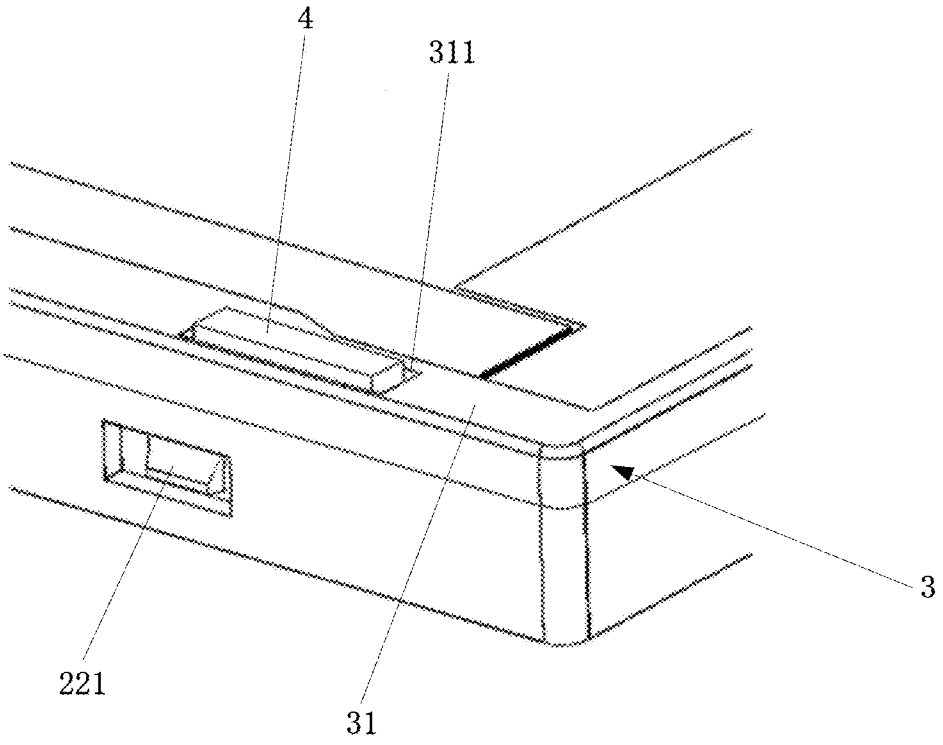
FIG. 3 is a schematic view of a partial cross-section of a display frame according to an embodiment of the present disclosure.
Figure 4:
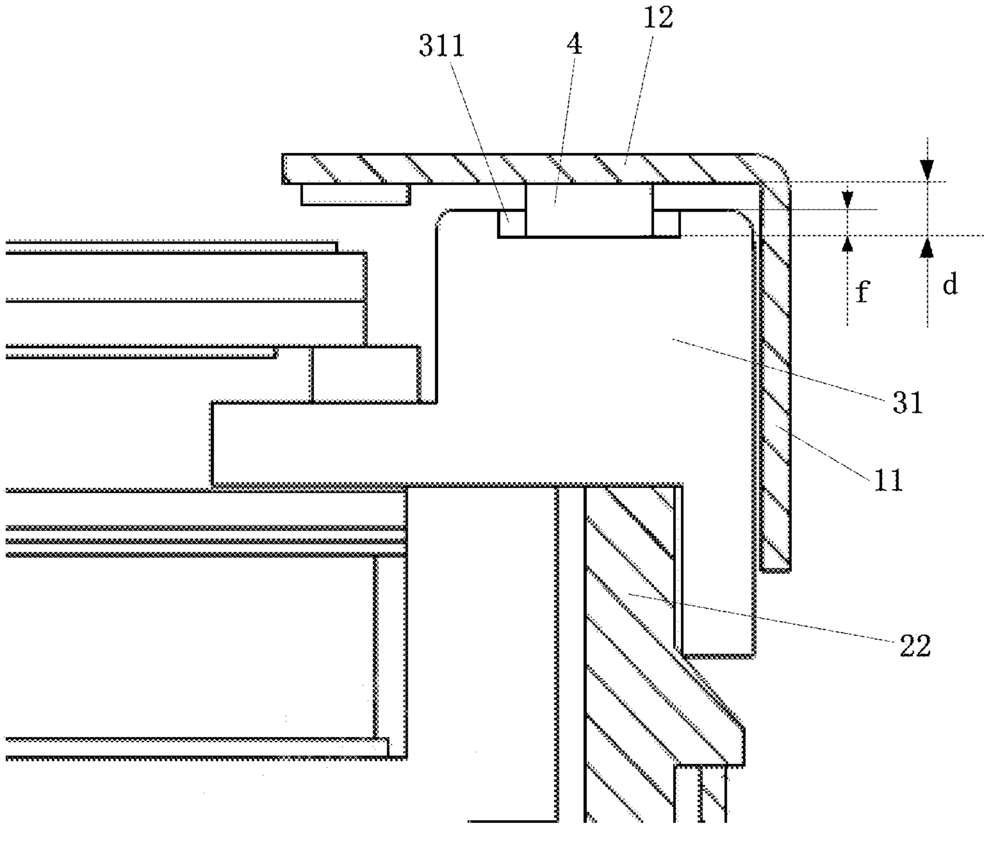
FIG. 4 is a schematic view of a partial cross-section of a display frame according to an embodiment of the present disclosure.

Based on the structure of the above display frame, there are multiple options for the arrangement of the elastic pad on the top surface of the second side wall. Specifically, in a possible implementation manner, as shown in FIGS. 3-4, a groove 311 is arranged on the top surface of the second side wall 31, the elastic pad is located in the groove 311, and a thickness of the elastic pad is greater than a depth of the groove 311. When there is a fit situation similar to the above-mentioned situation 1, that is, there is no fit gap between the back panel and the front frame, and the structure itself can be fitted without a gap, then during the assembling and snap-fitting, the elastic pad is completely compressed into the groove 311, so that the back panel and the front frame can be fitted tightly together. When there is a fit situation similar to the above-mentioned situation 2, there is a snap-fit gap between the back panel and the front frame, the elastic pad can play a supporting role to offset the snap-fit gap, so that the back panel and the front frame are fastened tightly. It is very convenient to use, the structure is simple, and the back panel and the front frame can be fitted well. In addition, the groove 311 has a certain limiting effect on the elastic pad, to make the elastic pad be well installed on the top surface of the second side wall 31.

Moreover, the elastic pad can be bonded to the bottom surface of the groove through the double-sided adhesive, and the connection method is simple and firm.

In addition, in order to achieve the better snap-fit between the back panel and the front frame, the thickness of the elastic pad and the depth of the groove satisfy the following relationship:

$$f + D < d \leq \frac{f}{n};$$

herein, f is the depth of the groove 311, D is the fit gap between the first snap part and the second snap part, d is the thickness of the elastic pad, and n is the compression ratio of the elastic pad.

Preferably, the elastic pad is set as a silicone pad, and the compression ratio of the silicone pad is up to 50%. According to the two extreme situations of the above situation 1 and situation 2, the maximum fit gap between the first lap surface and the second lap surface can reach 0.3 mm, so the preferred depth of the groove 311 is 0.4 mm, and then 0.7 mm<d≤0.8 mm. Preferably, d can be 0.75 mm~0.8 mm. Specifically, the depth of the groove 311 can be any value within 0.38 mm~0.42 mm, for example, 0.39 mm, 0.41 mm, or other values, which is not limited in the embodiments. The thickness of the silicone pad can be 0.76 mm, 0.77 mm or other values, which is not limited in the embodiments. As an example, a silicone pad with a thickness of 0.78 mm can be designed and assembled in the groove 311 of 0.4 mm, so that the back panel and the front frame can be fitted without a gap, and the assembly is tight, to avoid loosening to produce abnormal sounds and poor performance.

Due to the material characteristics of the silicone pad, the minimum cutting width is 1 mm. There is an attachment deviation when attaching the silicone pad. The attachment deviation is about 0.2 mm on one side. Considering that the cutting width of the silicone pad is 1 mm, an assembly tolerance of 0.2 mm is reserved on one side, and a process tolerance of 0.3 mm is reserved on both sides of the groove 311, the width of the second side wall 31 of the middle frame can be set to be greater than 2 mm. Therefore, for the size design of the silicone pad and the groove 311, the size along the extension direction of the first side wall 11 is taken as the length, and the size along the width direction of the first side wall 11 is taken as the width. The length $L_1$ of the groove and the width $W_1$ of the groove, as well as the length $L_2$ of the silicone pad and the width $W_2$ of the elastic pad, have the following relationship corresponding to the second side wall of different widths.

When the width of the second side wall is greater than or equal to 3 mm, the design sizes of the groove 311 are: the length is $L_1$, and the width is $W_1$; and the sizes of the silicone pad are: the length is $L_2$, and the width is $W_2$.

When the width of the second side wall is greater than or equal to 2 mm, and is smaller than 3 mm, the design sizes of the groove 311 are: the length is $L_1$, and the width is $(W_1-0.6)$; and the sizes of the silicone pad are: the length is $L_2$, and the width is $(W_2-0.4)$.

For the size design of the silicone pad and the groove, a suitable size can be selected as the length of the groove and a suitable size can be selected as the length of the silicone pad respectively and the widths of the groove and the silicone pad can be set according to the above formula as the width of the second side wall changes. Preferably, for example:

when the width of the second side wall 31 is greater than or equal to 3 mm, the design sizes of the groove 311 are: the length is 8.4 mm, and the width is 2.4 mm; and the sizes of the silicone pad are: the length is 8 mm, and the width is 2 mm; when the width of the second side wall is greater than or equal to 2 mm, and is smaller than 3 mm, the design sizes of the groove 311 are: the length is 8.4 mm, and the width is 1.8 mm; and the sizes of the silicone pad are: the length is 8 mm, and the width is 1.6 mm, or there can be other size designs which are not limited in the embodiments.

Figure 5:
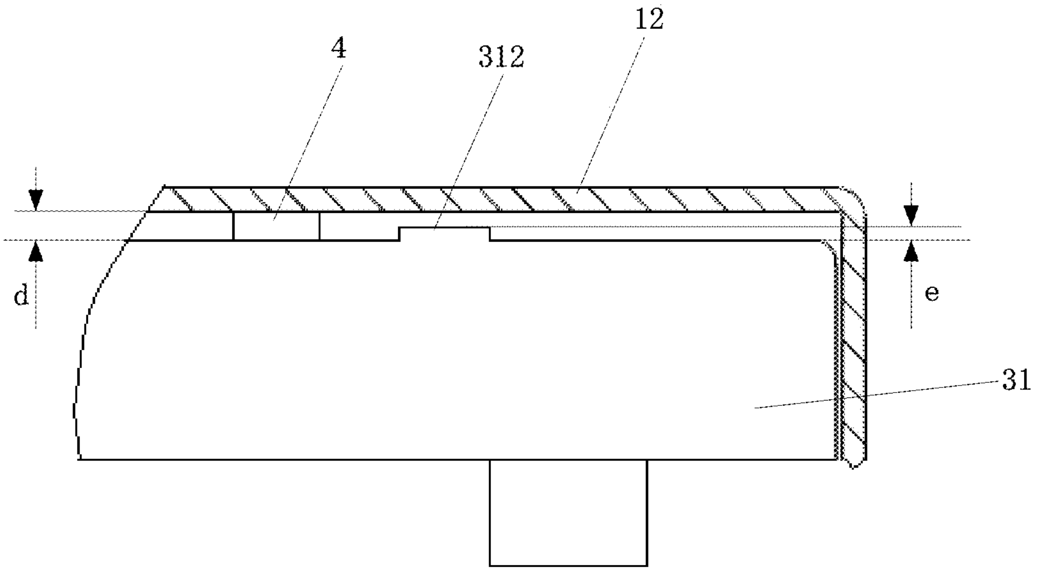
FIG. 5 is a schematic view of a partial cross-section of a display frame according to an embodiment of the present disclosure.

In another possible implementation, as shown in FIG. 5, a boss 312 is arranged on the top surface of the second side wall 31. Herein, the boss is arranged on the top surface of the second side wall, can be an integrated structure with the second side wall, and is formed by direct processing on the top surface of the second side wall; or the boss can be arranged on the top surface of the second side wall as a structure different from the second side wall. The elastic pad is located on the peripheral side of the boss 312, and the thickness of the elastic pad 4 is greater than the height of the boss 312. Then, when there is a fit situation similar to the above situation 1, that is, there is no fit gap between the back panel and the front frame, and the structure itself can be fitted without a gap, then during the assembling and snap-fitting, the elastic pad is compressed, and its thickness will be consistent with the height of the boss, so that the back panel and the front frame can be fitted tightly together. When there is a fit situation similar to the above situation 2, there is a snap-fit gap between the back panel and the front frame, then the thickness of the elastic pad is greater than the height of the boss, and the elastic pad can play a supporting role to offset the snap-fit gap, so that the back panel and the front frame are fastened tightly. It is very convenient to use, the structure is simple, and the back panel and the front frame can be fitted well. Moreover, the elastic pad can be pasted on the top surface of the second side wall 31 by double-sided adhesive tape, ensuring a stable connection. Specifically, the elastic pad can be arranged on one side of the peripheral sides of the boss, or can be arranged around the peripheral sides of the boss, which is not limited in the embodiments.

Moreover, for the better snap-fit between the back panel and the front frame, the thickness of the elastic pad and the height of the boss 312 satisfy the following relationship:

$$e + D < d \leq \frac{e}{n};$$

herein, e is the height of the boss 312, D is the fit gap between the first snap part and the second snap part, d is the thickness of the elastic pad, and n is the compression ratio of the elastic pad.

Preferably, the elastic pad is set as a silicone pad, and the compression ratio of the silicone pad is up to 50%. According to the two extreme situations of the above situation 1 and situation 2, the maximum fit gap between the first lap surface and the second lap surface can reach 0.3 mm, so the height of the boss 312 can be preferably 0.4 mm, and then 0.7 mm<d≤0.8 mm. Preferably, d can be 0.75 mm~0.8 mm. Specifically, the height of the boss 312 can be any value within 0.38 mm~0.42 mm, for example, 0.39 mm, 0.41 mm, or other values, which is not limited in the embodiments. Moreover, the thickness of the silicone pad can be 0.76 mm, 0.77 mm, or other values, which is not limited in the embodiments. Exemplarily, a silicone pad with a thickness of 0.78 mm can be designed and assembled on the peripheral side of the boss 312 with the height of 0.4 mm, so that the back panel and the front frame can be fitted without a gap, and the assembly is tight, to avoid loosening to produce abnormal sounds and poor performance.

Since the silicone pad is directly arranged on the peripheral side of the boss 312, the width of the boss 312 is smaller than the width of the first side wall 11, and the silicone pad whose width is smaller than the width of the second side wall 31 can be arranged at the second side wall 31, therefore, it can be adapted to the design of the second side wall 31 with a relatively narrow width. For example, when the width of the second side wall 31 is less than or equal to 2 mm, a boss 312 can be arranged on the top surface of the second side wall 31 to be used in conjunction with the silicone pad, so as to have the good snap-fit between the back panel and the front frame. It should be noted that for the second side wall with a relatively wide width, for example, when the width of the second side wall is greater than 2 mm, a boss can also be formed on the top surface of the second side wall to be used in conjunction with the elastic pad, and the setting of the boss on the top surface of the second side wall is not limited to the case that the width of the second side wall is less than or equal to 2 mm.

In a possible implementation manner, the hardness of the silicone pad is 50 degrees, which can play a good supporting role, so that the snap-fit between the back panel and the front frame is tight.

On the basis of any one of the above display frames, as shown in FIG. 2, an elastic pad is arranged on the top surface of the side wall, opposite to the first snap part, of the middle frame, so that the elastic pad corresponds to the side wall of the frame structure provided with a first snap part 111.

Figure 6:
FIG. 6 is a schematic view of distribution of elastic pads on side walls of a middle frame according to an embodiment of the present disclosure.

Specifically, along the extension direction of the corresponding first side wall 11, the position of the elastic pad is opposite to the first snap part 111, so that the elastic pad is arranged corresponding to the first snap part 111, that is, the elastic pad is correspondingly provided at the part where the back panel and the front frame have a snap-fit structure, which can better eliminate the fit gap and make the snap-fit between the back panel and the front frame tight. Preferably, combined with FIG. 1, as shown in FIG. 6, when the frame structure is a rectangular frame, first snap parts can be arranged on the sides of the short sides, and elastic pads can be arranged correspondingly, which is more convenient for assembly.

Furthermore, along the extension direction of a side wall of the middle frame on which the elastic pad is provided, there are at least two elastic pads, and the at least two elastic pads are sequentially arranged at intervals. Stable support can be provided between the middle frame and the front edge 12, so that the assembly between the back panel and the front frame is stable.

On the basis of any one of the above display frames, two opposite side walls of the middle frame have bulges protruding toward the inner side of the middle frame, and the bulges can be used for snap-fitting the glass substrate mounted on the middle frame, so that the glass substrate is securely mounted on the middle frame. The elastic pad is arranged on the top surface of the side wall, provided with the bulges, of the middle frame. Specifically, the bulge can be arranged on the inner side of each of the second side walls, which can better support the glass substrate and have better stability. On the other hand, the bulge is arranged on the inner side of the second side wall. Relative to the above structural arrangement of the groove and the silicone pad, the groove can be arranged at the part of the second side wall having the bulge, which is convenient for processing and arranging the groove. More specifically, when the width of the second side wall is greater than or equal to 2 mm, and is smaller than 3 mm, the groove can be arranged at the part of the second side wall having the bulge, so that the sum of the width of the second side wall and the width of the bulge can meet the requirement for the processing size of the groove.

More specifically, for the second side wall provided with bulges, at least two bulges may be arranged along the extension direction of the second side wall. At least two spaced bulges are arranged on the inner side of the same second side wall, which can support the glass substrate more evenly, and make the glass substrate more stable. On the other hand, it allows the elastic pad to have more layout position options, which is more convenient for the layout setting of the elastic pad.

Embodiments of the present disclosure also provides a display, including any display frame provided in the above embodiments, a display panel installed on the middle frame, and a backlight module installed inside the back panel. The backlight module is located between the display panel and the bottom plate of and the back panel.

Obviously, those skilled in the art can make various modifications and variations to the embodiments of the present disclosure without departing from the spirit and scope of the present disclosure. Thus, if these modifications and variations of the present disclosure fall within the scope of the claims of the present disclosure and equivalent technologies thereof, the present disclosure also intends to include these modifications and variations.

What is claimed is:

1. A display frame, comprising:

a front frame, a back panel, a middle frame, and an elastic pad;

wherein the front frame comprises:

a frame structure, and a front edge;

wherein the front edge is located at one end of the frame structure and extends toward a center of the frame structure; and opposite side walls of the frame structure are provided with a first snap part;

the back panel comprises:

a bottom plate, and a side plate located on a side edge of the bottom plate and extending toward one side of the bottom plate;

wherein an inner surface of the bottom plate is opposite to an inner surface of the front edge; the side plate is opposite to a side wall of the frame structure; the side plate is provided with a second snap part for fitting with the first snap part; and when the first snap part is snap-fitted with the second snap part, the second snap part is located on a side, facing the front edge, of the first snap part;

the middle frame is located in the front frame; and the elastic pad is located between a top surface of a side wall of the middle frame facing the front edge, and the front edge;

wherein the elastic pad supports between the top surface of the side wall of the middle frame and the front edge, so that the first snap part and the second snap part are tightly engaged;

wherein the top surface of the side wall of the middle frame is provided with a groove, the elastic pad is located in the groove, and a thickness of the elastic pad is greater than a depth of the groove; wherein the thickness of the elastic pad and the depth of the groove satisfy a following relationship:

$$f+D<d\leq f/n;$$

wherein, f is the depth of the groove, D is a fit gap between the first snap part and the second snap part, d is the thickness of the elastic pad, and n is a compression ratio of the elastic pad;

or wherein the top surface of the side wall of the middle frame is provided with a boss, the elastic pad is located on a peripheral side of the boss, and a thickness of the elastic pad is greater than a height of the boss; wherein the thickness of the elastic pad and the height of the boss satisfy a following relationship:

$$e+D<d\leq e/n.$$

wherein, e is the height of the boss, D is a fit gap between the first snap part and the second snap part, d is the thickness of the elastic pad, and n is a compression ratio of the elastic pad.

2. The display frame according to claim 1, wherein the elastic pad is located on the top surface of the side wall, opposite to the first snap part, of the middle frame.

3. The display frame according to claim 1, wherein, along an extension direction of the side wall, on which the elastic pad is located, of the middle frame, at least two elastic pads are provided, and the at least two elastic pads are sequentially arranged at intervals.

4. The display frame according to claim 1, wherein the elastic pad comprises a silicone pad.

5. The display frame according to claim 1, wherein the side plate is located inside the side wall of the frame structure; the side wall of the frame structure is provided with a notch; a side, away from the front edge, of the notch bends and extends inward to form the first snap part; and the first snap part has a first lap surface on a side facing the front edge;

an outer side of the side plate is provided with a protrusion protruding outward, and the protrusion forms the second snap part; the second snap part has a second lap surface on one side facing the bottom plate; and the second lap surface is used for snap-fitting with the first lap surface; and the middle frame is located between a top surface of the side plate facing the front edge, and the front edge.

6. A display, comprising:

the display frame according to claim 1, a display panel installed on the middle frame; and a backlight module installed in the back panel;

wherein the backlight module is located between the display panel and the bottom plate of the back panel.

7. The display according to claim 6, wherein the elastic pad is located on the top surface of the side wall, opposite to the first snap part, of the middle frame.

8. The display according to claim 6, wherein, along an extension direction of the side wall, on which the elastic pad is located, of the middle frame, at least two elastic pads are provided, and the at least two elastic pads are sequentially arranged at intervals.

9. The display according to claim 6, wherein the elastic pad comprises a silicone pad.

10. The display according to claim 6, wherein the side plate is located inside the side wall of the frame structure; the side wall of the frame structure is provided with a notch; a side, away from the front edge, of the notch bends and extends inward to form the first snap part; and the first snap part has a first lap surface on a side facing the front edge;

an outer side of the side plate is provided with a protrusion protruding outward, and the protrusion forms the second snap part; the second snap part has a second lap surface on one side facing the bottom plate; and the second lap surface is used for snap-fitting with the first lap surface; and the middle frame is located between a top surface of the side plate facing the front edge, and the front edge.

* * * * *